US 8,654,653 B2

(12) United States Patent
Bae

(10) Patent No.: US 8,654,653 B2
(45) Date of Patent: Feb. 18, 2014

(54) METHOD OF DECIDING RADIO LINK FAILURE AT BASE STATION

(75) Inventor: Jung Sook Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 228 days.

(21) Appl. No.: 13/334,488

(22) Filed: Dec. 22, 2011

(65) Prior Publication Data

US 2012/0163192 A1 Jun. 28, 2012

(30) Foreign Application Priority Data

Dec. 23, 2010 (KR) .......................... 10-2010-0133306

(51) Int. Cl.
G01R 31/08 (2006.01)
H04B 7/00 (2006.01)
H04B 7/212 (2006.01)

(52) U.S. Cl.
USPC ........... 370/242; 370/252; 370/277; 370/442; 370/331

(58) Field of Classification Search
None
See application file for complete search history.

(56) References Cited

U.S. PATENT DOCUMENTS

| | | | |
|---|---|---|---|
| 2006/0274866 A1* | 12/2006 | Chang | 375/346 |
| 2008/0008212 A1 | 1/2008 | Wang et al. | |
| 2008/0076404 A1 | 3/2008 | Jen | |
| 2009/0103740 A1* | 4/2009 | Yoshioka | 381/58 |
| 2010/0041389 A1 | 2/2010 | Cave et al. | |
| 2010/0112956 A1 | 5/2010 | Jeong et al. | |
| 2011/0013506 A1* | 1/2011 | Ishii et al. | 370/208 |
| 2012/0005548 A1* | 1/2012 | Rao | 714/748 |

FOREIGN PATENT DOCUMENTS

| | | |
|---|---|---|
| JP | 2008-79311 | 4/2008 |
| KR | 1020100050340 | 5/2010 |
| KR | 1020100092032 | 8/2010 |

\* cited by examiner

*Primary Examiner* — Steven H Nguyen
*Assistant Examiner* — Abu-Sayeed Haque
(74) *Attorney, Agent, or Firm* — Nelson Mullins Riley & Scarborough LLP

(57) ABSTRACT

Disclosed is a method of deciding a radio link failure at a base station. The method includes initializing a signal quality degradation count value, measuring an uplink signal quality at predetermined time intervals, and increasing the signal quality degradation count value when the uplink signal quality is less than a predetermined lower limit quality threshold value, wherein a radio link failure is decided when the signal quality degradation count value reaches a predetermined radio link failure decision threshold value while the measuring of the uplink signal quality and the increasing of the signal quality degradation count value are repetitively performed a predetermined number of times.

5 Claims, 2 Drawing Sheets

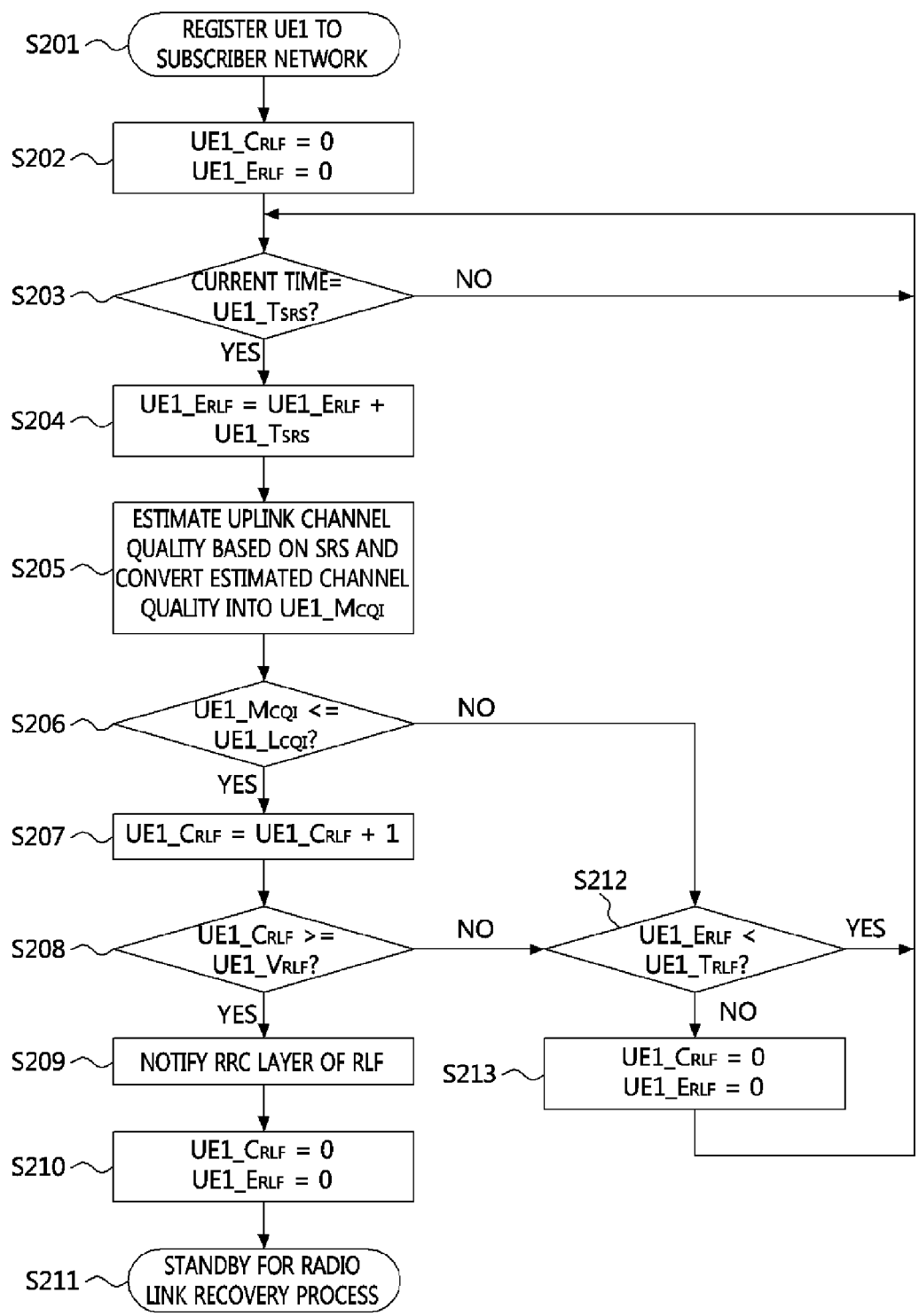

METHOD OF DECIDING RADIO LINK FAILURE AT BASE STATION

CLAIM FOR PRIORITY

This application claims priority to Korean Patent Application No. 10-2010-0133306 filed on Dec. 23, 2010 in the Korean Intellectual Property Office (KIPO), the entire contents of which are hereby incorporated by reference.

BACKGROUND

1. Technical Field

Example embodiments of the present invention relate in general to a mobile communication system, and more specifically, to a method of deciding a radio link failure at a base station in a mobile communication system.

2. Related Art

A radio link failure refers to a situation in which an unexpected delay or discontinuity occurs in a radio bearer providing a service due to a signal propagation condition inappropriate to a radio environment between a user terminal and a base station, a system malfunction, or the like.

Appropriate detection of the radio link failure is an important factor for rapidly re-establishing a radio connection and providing a user with high service fidelity.

In particular, when a radio link status between a terminal and a base station is not smooth, since the terminal has to be handed over to another base station through a radio resource control (RRC) entity after detection of the radio link failure, detection of the radio link failure is an important factor for guaranteeing service fidelity. For example, when the terminal enters a coverage hole, or the like, it is important to rapidly detect the radio link failure and hand over the terminal to an appropriate target cell so as to minimize a call drop.

Typically, the radio link failure is detected based on the channel quality measured in a physical layer of a terminal or a base station. Generally, since the measurement of the channel quality in the physical layer of the terminal is performed in a downlink, it is more accurate for the base station, which can collect both the uplink channel quality and the downlink channel quality, to estimate a radio link status based on measurement of the channel quality.

The base station measures the downlink channel quality based on a channel quality indicator (CQI) fed back through a physical uplink shared channel (PUSCH) or the physical uplink control channel (PUCCH). However, when the uplink channel quality is bad, it is difficult to expect the accuracy of the downlink CQI information fed back through the uplink channel.

SUMMARY

Accordingly, example embodiments of the present invention are provided to substantially obviate one or more problems due to limitations and disadvantages of the related art.

Example embodiments of the present invention provide a method of stably and reliably deciding a radio link failure at a base station based on measurement of the channel quality of an uplink signal from a terminal, which allows a rapid handover oriented by a base station and a seamless mobile communication service.

In some example embodiments, a method of deciding a radio link failure at a base station based on measurement of a quality of an uplink signal from a terminal, includes: initializing a signal quality degradation count value; measuring an uplink signal quality at predetermined time intervals; and increasing the signal quality degradation count value when the uplink signal quality is less than a predetermined lower limit quality threshold value, wherein a radio link failure is decided when the signal quality degradation count value reaches a predetermined radio link failure decision threshold value while the measuring of the uplink signal quality and the increasing of the signal quality degradation count value are repetitively performed a predetermined number of times.

The uplink signal may be transmitted at a predetermined transmission period using a predetermined time-frequency resource and configured with a predetermined sequence.

The uplink signal may be a sounding reference signal (SRS).

The predetermined time interval may be an integer multiple of a transmission period of the uplink signal.

The predetermined number of times may be an integer multiple of the predetermined time interval.

The predetermined number of times may be within a time obtained by dividing a time obtained by subtracting a time required for handover signaling after the radio link failure is decided from a predetermined connection drop time which can be endured by a user, by the predetermined time interval.

When the signal quality degradation count value does not reach the predetermined radio link failure decision threshold value even after the measuring of the uplink signal quality and the increasing of the signal quality degradation count value are repeated the predetermined number of times, a process may be performed again starting from the initializing of the signal quality degradation count value.

BRIEF DESCRIPTION OF DRAWINGS

Example embodiments of the present invention will become more apparent by describing in detail example embodiments of the present invention with reference to the accompanying drawings, in which:

FIG. 2 is a flowchart for explaining an example of an algorithm for implementing a method of deciding a radio link failure according to an embodiment of the present invention.

DESCRIPTION OF EXAMPLE EMBODIMENTS

Figure 1:
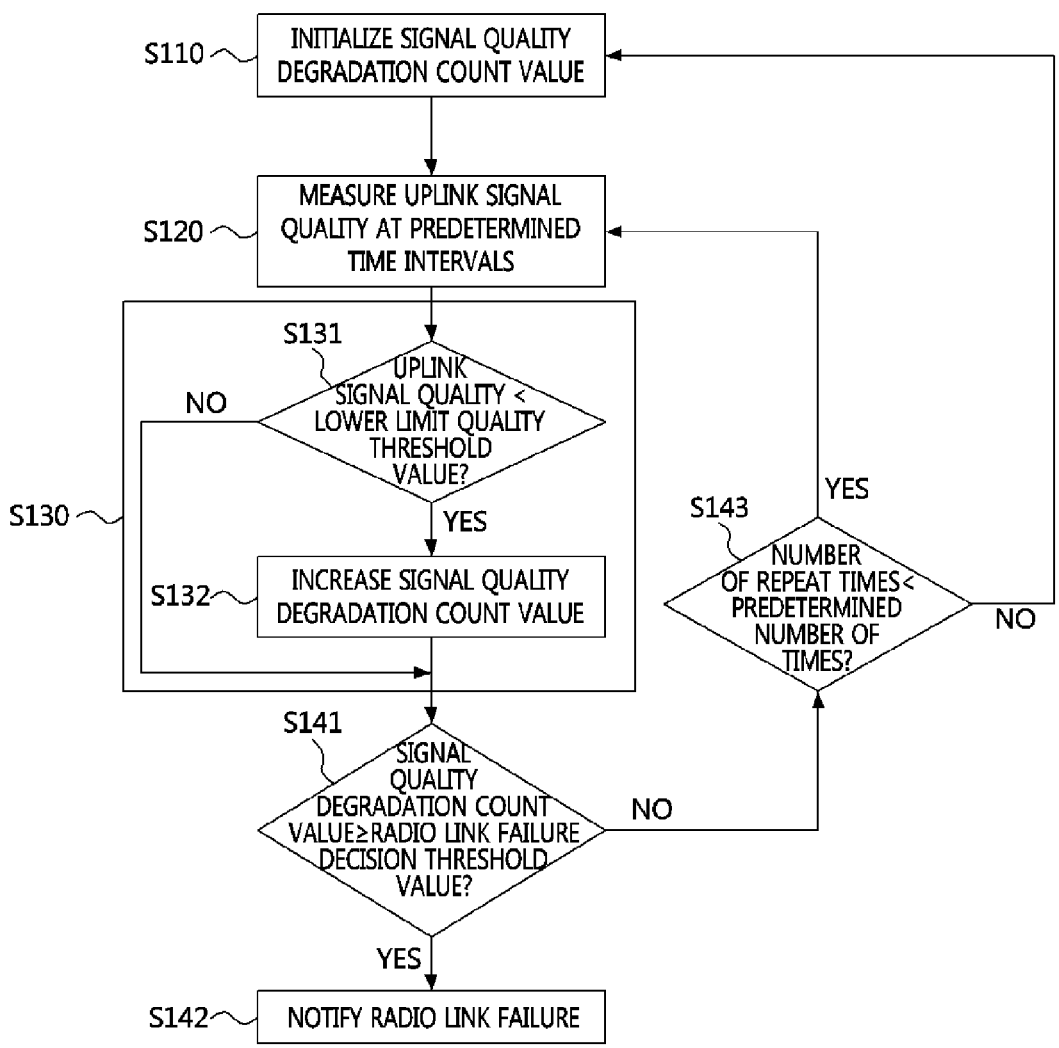
FIG. 1 is a flowchart for explaining a method of deciding a radio link failure according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, exemplary embodiment of the present invention will be described with reference to the accompanying drawings.

A method of deciding a radio link failure according to the present invention allows a base station to measure an uplink channel quality and decide a radio link failure. That is, when the base station detects or decides the radio link failure based on downlink CQI information fed back through a PUSCH or the PUCCH, there is a problem in that it is difficult to expect the accuracy of downlink CQI information fed back through the uplink channel in a status in which the uplink channel quality is bad. This problem is solved by the method of deciding the radio link failure according to the present invention.

Further, the method of deciding the radio link failure according to the present invention may use a sounding reference signal (SRS), which is an uplink reference signal to measure the uplink channel quality. The SRS is periodically transmitted at a wideband from the terminal to the base station using a transmission period and a resource which are set by an RRC entity and is used for measuring the uplink channel quality for uplink resource allocation. A history of CQI information measured based on the SRS is managed and used as information for deciding the radio link failure state. That is, a radio link between the terminal and the base station is required to guarantee the channel quality capable of maintaining at least a signal radio bearer (SRB) for basic control information transfer, however, when the channel quality which cannot maintain the SRB is detected during a predetermined time period or more, it can be decided as the radio link failure state.

FIG. 1 is a flowchart for explaining a method of deciding a radio link failure according to an embodiment of the present invention.

Referring to FIG. 1, the method of deciding a radio link failure according to an embodiment of the present invention is a method of deciding a radio link failure based on measurement of the quality of an uplink signal from a terminal. The method may include operation S110 of initializing a signal quality degradation count value, operation S120 of measuring an uplink signal quality at predetermined time intervals, and operation S130 of increasing the signal quality degradation count value when the uplink signal quality is less than a predetermined lower limit quality threshold value, wherein a radio link failure is decided when the signal quality degradation count value reaches a predetermined radio link failure decision threshold value while operations S120 and S130 are repetitively performed a predetermined number of times.

That is, in the method of deciding the radio link failure according to an embodiment of the present invention, the quality of an uplink signal is measured at predetermined time intervals during a predetermined time period, it is determined whether or not the quality of the uplink signal measured at each time interval is less than the predetermined lower limit quality threshold value, and the radio link failure is declared when the number of times that the quality is less than the lower limit quality threshold value is equal to or more than the predetermined radio link failure decision threshold value.

As described above, the SRS may be used as an uplink signal whose quality is to be measured. However, the method of deciding the radio link failure according to an embodiment of the present invention is not limited to the SRS, and any uplink signal which is transmitted using a predetermined sequence at a predetermined resource location (for example, a time-frequency resource in the case of orthogonal frequency-division multiplexing (OFDM) transmission) at predetermined time intervals may be used as the uplink signal whose quality is to be measured.

In operation S110, the signal quality degradation count value is initialized to zero (0).

Next, in operation S120, the predetermined time interval for measuring the quality of the uplink signal may be an integer multiple of a transmission period of the uplink signal whose quality is to be measured. That is, in order to rapidly decide the radio link failure, it is desirable to set the predetermined time interval to be equal to the transmission period of the uplink signal whose quality is to be measured. However, when the transmission period of the uplink signal is short, the measurement time interval may be set to a multiple of the transmission period. When the SRS is used as the uplink signal whose quality is to be measured, the predetermined time interval may be an integer multiple of an SRS transmission period.

Here, the channel quality of the uplink signal may be measured using all available algorithms, and the CQI and the lower limit quality threshold value (which will be described in operation S130) representing the measured channel quality of the uplink signal may be decided based on information following an operation history of each system. For example, at least one or various combinations of a received signal strength indicator (RSSI), a signal to interference/noise ratio (SINR), and a signal to noise ratio (SNR), or other indicators may be used as an indicator of the CQI and the lower limit quality threshold value representing the channel quality of the uplink signal.

Referring to operation S130, in operation S131, it is determined whether or not the quality of the uplink signal measured in operation S120 is less than the predetermined lower limit quality threshold value. When it is determined that the quality of the uplink signal is less than the predetermined lower limit quality threshold value, in operation S132, the signal quality degradation count value increases. However, when it is determined that the quality of the uplink signal measured is not less than the predetermined lower limit quality threshold value, the signal quality degradation count value does not increase.

In the method of deciding the radio link failure according to an embodiment of the present invention, while operations S120 and S130 are repetitively performed the predetermined number of times, when the signal quality degradation count value reaches the predetermined radio link failure decision threshold value, the radio link failure is declared (the radio link failure is declared when the signal quality degradation count value has already reached the predetermined radio link failure decision threshold value even if the number of repetition times has not reached the predetermined number of times).

However, when operations S120 and S130 are repeated the predetermined number of times but the signal quality degradation count value does not reach the predetermined radio link failure decision threshold value, the process returns to operation S110 without declaring the radio link failure, and the quality of the uplink signal is repetitively measured again.

That is, referring to FIG. 1, the method of deciding the radio link failure according to an embodiment of the present invention may further include operation S141 of determining whether or not the signal quality degradation count value is equal to or more than the radio link failure decision threshold value, operation S142 of notifying the radio link failure when it is determined that the signal quality degradation count value is equal to or more than the radio link failure decision threshold value, and operation S143 of determining whether or not the number of repetition times is smaller than the predetermined number of times when it is determined that the signal quality degradation count value is not equal to or more than the radio link failure decision threshold value. In operation S143, when it is determined that the number of repetition times is smaller than the predetermined number of times, the process proceeds to operation S120. However, when it is determined that the number of repetition times is not smaller than the predetermined number of times, the process proceeds to operation S110, and the signal quality degradation count value is initialized.

Here, the predetermined number of times may be decided within a time obtained by dividing a time obtained by subtracting a time required for handover signaling after the radio link failure is decided from a predetermined connection drop time which can be endured by a user, by the predetermined time interval in operation S120.

The method of deciding the radio link failure according to an embodiment of the present invention illustrated in FIG. 1 may be implemented using various algorithms. FIG. 2 is a flowchart for explaining an example of an algorithm for implementing a method of deciding a radio link failure according to an embodiment of the present invention.

In the algorithm illustrated in FIG. 2, it is assumed that the SRS is used as the uplink signal whose quality is to be measured, the time interval for measuring the quality of the uplink signal is equal to the transmission period of the SRS, and the number of times that operations S120 and S130 of FIG. 1 are repeated is set to a multiple N of the transmission period of the SRS. The signal quality degradation count value is defined as $UE1\_C_{RLF}$, and the lower limit quality threshold value is defined as $UE1\_L_{CQI}$. Meanwhile, as a method of repeating operations S120 and S130 of FIG. 1 the predetermined number of times N, it is determined whether or not a value of $UE1\_E_{RLF}$ obtained by accumulating a signal quality measurement period $UE1\_T_{SRS}$ each time a signal quality measurement period comes is smaller than a value of a radio link failure decision period ($=N*UE1\_T_{SRS}$) for UE1, and when it is determined when the value of $UE1\_E_{RLF}$ is smaller than the value of the radio link failure decision period ($=UE1\_T_{SRS}$) for UE1, operations S120 and S130 of FIG. 1 are repeated. Further, the radio link failure decision threshold value compared with the count value that the uplink signal quality is less than the lower limit quality threshold value is defined as $UE1\_V_{RLF}$.

That is, notations used in FIG. 2 have the following meanings.

$UE1\_T_{SRS}$: transmission period of SRS transmitted to UE1

$UE1\_T_{RLF}$: radio link failure decision period ($=N*UE1\_T_{SRS}$) for UE1

N: (user endurance service connection drop time-handover signaling time)/$UE1\_T_{SRS}$ $UE1\_E_{RLF}$: elapsed time after each $UE1\_T_{SRS}$ expires for UE1

$UE1\_L_{CQI}$: lower limit CQI for maintaining SRB for UE1

$UE1\_M_{CQI}$: CQI measured at $UE1\_T_{SRS}$ for UE1

$UE1\_V_{RLF}$: reference number of times that $UE1\_L_{CQI}$ to be decided as radio link failure is experienced during $UE1\_T_{RLF}$ $UE1\_C_{RLF}$: count value during $UE1\_T_{RLF}$ when $UE1\_M_{CQI}$ is less than $UE1\_L_{CQI}$ Next, a flowchart of FIG. 2 will be described below.

In operation S201, a terminal UE1 is connected to a base station, and registered to a subscriber network.

In operation S202, the base station initializes $UE1\_C_{RLF}$, which is the number of times that $UE1\_M_{CQI}$ that is a CQI measured at $UE1\_T_{SRS}$ for UE1 during $UE1\_T_{RLF}$ is equal to or less than $UE1\_L_{CQI}$, and $UE1\_E_{RLF}$, which is obtained such that an elapsed time after each $UE1\_T_{SRS}$ expires is accumulated, to zero (0).

In operation S203, the base station determines whether or not a time for measuring the channel quality of the uplink SRS comes by determining whether or not the current time is the period of $UE1\_T_{sRs}$.

In operation S204, when it is determined that the current time is the period of $UE1\_T_{SRS}$, $UE1\_E_{RLF}$ which is an elapsed time after each $UE1\_T_{SRS}$ expires for UE1 increases as follows.

$UE1\_E_{RLF}=UE1\_E_{RLF}+UE1\_T_{SRS}$

In operation S205, the uplink quality for UE1 is estimated based on the received SRS and converted into $UE1\_M_{CQI}$ which is the CQI.

In operation S206, it is determined whether or not $UE1\_M_{CQI}$ is equal to or smaller than $UE1\_L_{CQI}$ which is the downlink CQI for maintaining the SRB for UE1.

When it is determined that $UE1\_M_{CQI}$ is equal to or smaller than $UE1\_L_{CQI}$, in operation S207, $UE1\_C_{RLF}$ which is the number of times that $UE1\_L_{CQI}$ is obtained during $UE1\_T_{RLF}$ increases by one. Then, in operation S208, it is determined whether or not $UE1\_C_{RLF}$ is equal to or larger than $UE1\_V_{RLF}$ which is the reference number of times that $UE1\_L_{CQI}$ to be decided as the radio link failure is experienced during $UE1\_T_{RLF}$.

In operation S209, when it is determined that $UE1\_C_{RLF}$ is equal to or larger than $UE1\_V_{RLF}$, an RRC layer informs the radio link failure so that a handover to another base station or a radio link recovery process can be performed. Then, in operation S210, $UE1\_C_{RLF}$ and $UE1\_E_{RLF}$ are initialized to zero (0), and in operation S211, it is on standby for a handover process or a radio link recovery process.

When it is determined in operation S208 that $UE1\_C_{RLF}$ is smaller than $UE1\_V_{RLF}$ which is the reference number of times that $UE1\_L_{CQI}$ to be decided as the radio link failure is experienced during $UE1\_T_{RLF}$, in operation S212, it is determined whether or not $UE1\_E_{RLF}$ is larger than or equal to $UE1\_T_{RLF}$ which is the radio link failure decision period for UE1. When it is determined that $UE1\_E_{RLF}$ is smaller than $UE1\_T_{RLF}$, the process returns to operation S203, and operation S203 and subsequent operations are performed. However, when it is determined that $UE1\_E_{RLF}$ is not smaller than $UE1\_T_{RLF}$, in operation S213, $UE1\_C_{RLF}$ and $UE1\_E_{RLF}$ are initialized to zero (0), and the process returns to operation S203.

Using a method of deciding a radio link failure according to the present invention, a history of CQI information of each terminal measured based on an SRS which is an uplink reference signal transmitted at a wideband from a terminal to a base station in an LTE-based mobile communication system is managed, and a radio link failure state of each terminal is decided by the base station. Thus, a rapid handover oriented by the base station can be induced, and a more seamless mobile communication service can be provided.

While the example embodiments of the present invention and their advantages have been described in detail, it should be understood that various changes, substitutions and alterations may be made herein without departing from the scope of the invention.

What is claimed is:

1. A method of deciding a radio link failure at a base station based on measurement of a quality of an uplink signal from a terminal, comprising: initializing a signal quality degradation count value; measuring an uplink signal quality at predetermined time intervals; and increasing the signal quality degradation count value when the uplink signal quality is less than a predetermined lower limit quality threshold value, wherein a radio link failure is decided when the signal quality degradation count value reaches a predetermined radio link failure decision threshold value while the measuring of the uplink signal quality and the increasing of the signal quality degradation count value are repetitively performed a predetermined number of times wherein the predetermined number of times is an integer multiple of the predetermined time interval wherein the predetermined number of times is within a time obtained by dividing a time obtained by subtracting a time required for handover signaling after the radio link failure is decided from a predetermined connection drop time which can be endured by a user, by the predetermined time interval.

2. The method of claim 1, wherein the uplink signal is transmitted at a predetermined transmission period using a predetermined time-frequency resource and configured with a predetermined sequence.

3. The method of claim 2, wherein the uplink signal is a sounding reference signal (SRS).

4. The method of claim 2, wherein the predetermined time interval is an integer multiple of a transmission period of the uplink signal.

5. The method of claim 1, wherein, when the signal quality degradation count value does not reach the predetermined radio link failure decision threshold value even after the measuring of the uplink signal quality and the increasing of the signal quality degradation count value are repeated the predetermined number of times, a process is performed again starting from the initializing of the signal quality degradation count value.

* * * * *